March 12, 1940.                P. KELLER                2,193,728
                        FABRIC-APPLYING APPARATUS
                          Filed Oct. 21, 1936
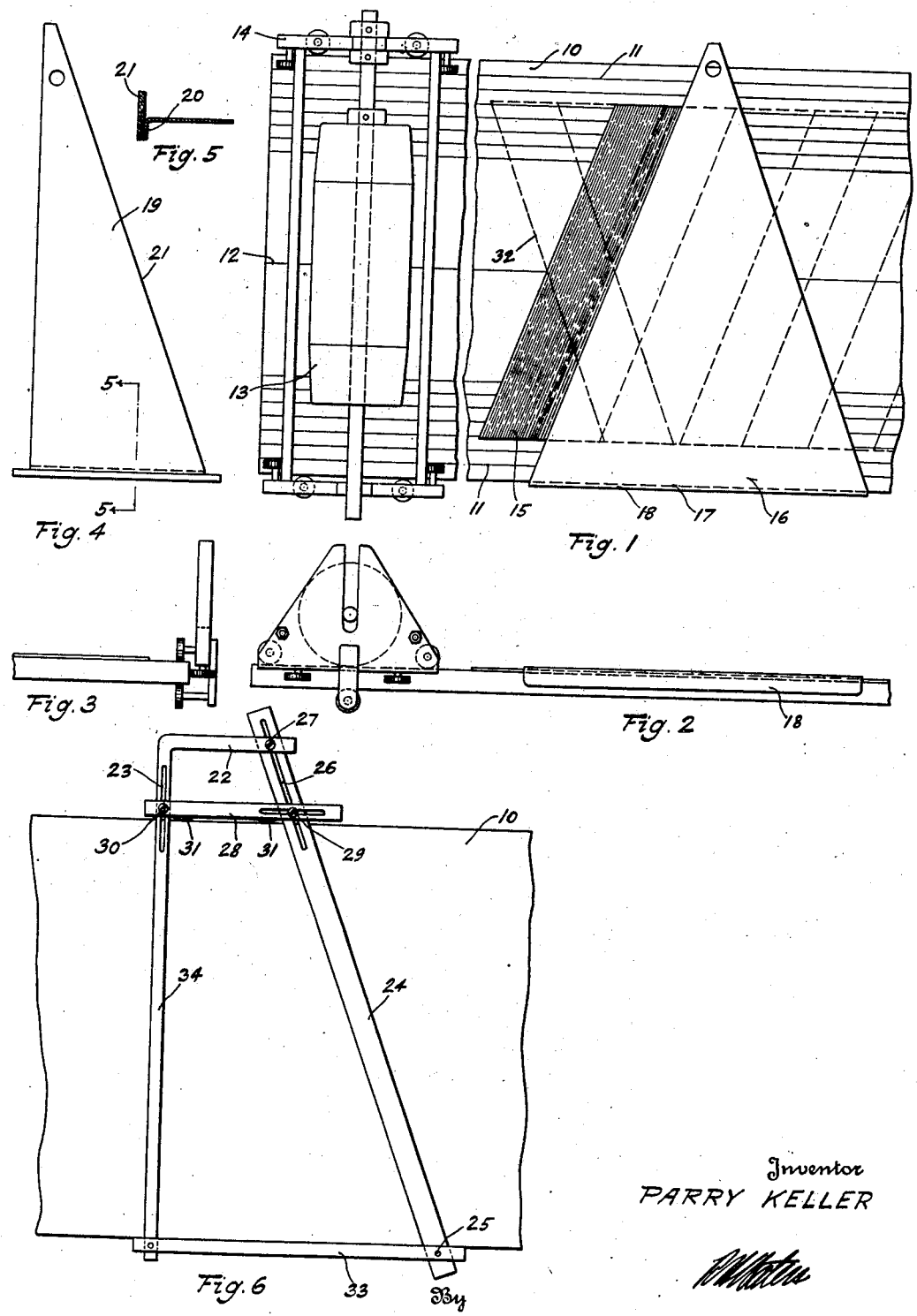
Inventor
PARRY KELLER Patented Mar. 12, 1940

2,193,728

UNITED STATES PATENT OFFICE 2,193,728

FABRIC-APPLYING APPARATUS

Parry Keller, Akron, Ohio, assignor to Wingfoot Corporation, Wilmington, Del., a corporation of Delaware Application October 21, 1936, Serial No. 106,855

2 Claims. (Cl. 33—76)

The present invention relates to an improved means for laying out bias-cord fabric on a layout table in such a manner that the cords thereof are all arranged substantially parallel to each other and at a predetermined angle.

This invention is an improvement on the invention disclosed in the application of Ralph B. Day, Serial No. 58,529, filed Jan. 10, 1936.

Another object of this invention is to provide a suitable mechanical aid in laying out bias-cut fabric in such a manner that the cords of the fabric will be in parallelism, or substantially so, in order that the cords of the fabric will occupy a definite angular position on the building drum when the fabric is applied thereto.

Another object of this invention is to provide a device for aligning the cords of narrow strips of bias-cut fabric on a work table independently of the width of the strips and the position which they occupy on the table.

Other objects of this invention will appear hereinafter as the description hereof proceeds, the novel features, arrangements and combinations being clearly set forth in the specification and the claims thereunto appended.

In the drawing,

Fig. 1 is a plan view of a device embodying my invention;

Fig. 2 is a front elevational view of the device shown in Fig. 1;

Fig. 3 is a fragmentary end elevation of the device shown in Fig. 2;

Fig. 4 shows a plan view of a modification of the mechanism disclosed in Figs. 1, 2 and 3;

Fig. 5 is a cross-section taken substantially along the line 5—5 of Fig. 4; and

Fig. 6 is a plan view showing a still further modification of my invention.

In certain types of tires, it is very important that all of the cords in the fabric used be arranged on the surface of the building drum at a definite angle with respect thereto. Ordinarily in cord fabric the cords are not all parallel to each other, due, primarily, to initial weaving or forming of the fabric, to spreading of the cords during frictioning of same with rubber and the like, and through subsequent handling. Therefore, it becomes of prime importance in building certain types of tires to adjust the cord angles so that they are all substantially parallel to each other on the surface of the building drum. One method for doing this is disclosed in the aforesaid application of Day. The present invention, however, is an improvement on the invention of Day and facilitates the work of adjusting the cord angles of the fabric which is used, especially where the strips are of different widths.

The work table and building drum guide is similar to that disclosed in the application to Day, with the exceptions that will be pointed out later. The reference character 10 indicates a flat layout table on which there are a series of parallel markings 11 near the outer edges thereof, these markings being used for the purpose of determining the length to which the bias-cut fabric should be trimmed off for the particular sized tire being built, and also for centering the strip of bias-cut fabric on the table so that equal or desired portions thereof will lie on opposite sides of a center line 12, which also indicates the center line of a building drum 13 mounted on a carriage 14 which is guided longitudinally along the table 10 in a definite path, as is more fully described in the aforesaid application to Day.

The bias-cut fabric is either initially formed into narrow strips 15 or subsequently torn into narrow strips before being applied to the surface of the table 10. These strips in practice are preferably from 3 to 6 inches wide, although applicant does not limit himself to these specific dimensions. Usually the limits for the widths of the strips being used is set for different sizes or types of tires.

In addition to having the strips of fabric arranged so that equal portions thereof are on opposite sides of the center line 12, it is necessary to lay the strips of fabric on the surface of the table with all of the cords thereof arranged parallel to each other and at a definite angle with respect to said centering line 12. In the aforesaid application of Day parallel lines were inscribed on the surface of the table at a definite angle to the center line, or pegs were set at equal intervals, but since the lines or pegs were spaced somewhat from each other the edges of the strips of fabric would not always coincide with the markings on the table, where stops of different widths were used. Thus, it would be up to the operator to gauge by the eye intermediate imaginary parallel lines between those used. Even if a great number of lines were provided on the surface of the table, the operator still had to lay the fabric on the table to match these lines and, due partly to the stickiness of the fabric, a considerable amount of time was wasted in laying out the strips of fabric so that the edges thereof were parallel to lines on the table. In order to overcome this difficulty, applicant has provided a device which can be used in laying out the strips on the surface of the table 10. This means comprises a template 16 of a shape which is substantially an isosceles triangle with the base 17 thereof formed with an outwardly extending flange 18 adapted to abut against the edge of the table 10 to act as a guide for the template 16. In this way, the template can be shifted longitudinally of the table to different positions, all of which are parallel to each other, by merely keeping the guide flange 18 against the edge of the table. The cord fabric, which is cut into narrow strips 15, is applied to the table in the following manner. One edge thereof is abutted against the edge of the template as shown in Fig. 1. Since the fabric is torn between adjacent cords if the edge of the fabric is abutted against the edge of the template, the cord at the edge of the strip is lined up in the proper angular position on the table since the angle of the template is at the angle desired for the particular tire being built. The operator, by reversing the position of the template and placing the guide flange 18 against the opposite edge of the table may then align the left-hand edge of the fabric in a similar manner, thereby positioning the end cords of the strip in parallel relation to each other. If the fabric is then stitched to the table in a uniform manner the intermediate cords tend to assume a substantially parallel position. Successive strips are then placed in abutting relation to the first strip and as these successive strips are applied it is only necessary to slide the template along the table from the position illustrated in Fig. 1. The reason for this is that the edge of the first strip may be used as a guide to position the edge of the second strip, thus aligning that edge with the edge of the first strip. The opposite or free edge of the second strip or succeeding strips is aligned by the edge of the template. Thus, a composite strip is formed in which the cords are all arranged substantially parallel to each other and at least sufficiently so for the purposes required. Since the template is slidable along the table, it can always be adjusted to coincide with the edge of the fabric so that the operator does not have to rely on his own estimation of the angle as to whether the strip is at the proper angle with respect to the center line 12.

Usually in tire construction different plies are arranged at opposite angles and when a ply of the opposite angle to that illustrated in full lines in Fig. 1 is desired the opposite edge or right-hand edge of the template 16 is used for aligning the cords of the fabric, the strips of fabric then being arranged as indicated at 32 in Fig. 1.

The composite strip of fabric is rolled onto the drum 13 by movement of the carriage 14 over the surface of the table, the drum resting of its own weight against the plies of fabric and picking up the strips of fabric on its surface as it moves thereover, as in the aforesaid application of Day. Thus, a very simple means is provided for mechanically laying out the cord fabric with the cords thereof in substantially parallel relation at a definite angle with respect to the layout table.

In Figs. 4 and 5 I have illustrated a modified template 19 which has a turned-down edge 20 similar to 18 of the template shown in Figs. 1 and 2, and to this there is attached another guide flange 21 so that there are guiding flanges above and below the plane of the template proper. The hypotenuse of the triangle is used as the guiding edge for the fabric strips and when the opposite angle is desired the template is merely reversed so that the hypotenuse lies on the left instead of on the right as in Fig. 4. Since there are guiding flanges above and below the plane of the template, a guiding surface is provided for the template in either of its positions so that it may be guided along the table the same as in Fig. 1.

Various types of tires may require different angular positions for the cords and instead of providing a multiplicity of templates, such as shown in Figs. 1 and 4, I propose to provide a single template which has a fabric-guiding strip which is adjustable to various angular positions to the means which guides the template along the table. This device is shown more clearly in Fig. 6 in which 10 is the layout table. The template is provided with a guiding strip 33 to which is pivoted a strip 34 extending transversely of the table, this strip having an offset portion 22 and being formed with a slot 23. The fabric-guiding edge of the template is formed by a strip 24 pivoted at 25 to the guide strip 33. The strip 24 is provided with a guide slot 26 through which a clamping screw 27 extends. A second guide strip 28, provided with pins 29 and 30 which pass through the respective slots 26 and 23, is used to rigidly hold the guide strip 24 in its proper angular position when the screws 30 and 29 are tightened. By loosening the screws 27, 29 and 30, the angular position of the strip 24 with respect to the guide strip 33 may be adjusted and then the parts are held in rigid fixed relation by tightening the screws 27, 29 and 30. The member 28 is provided with springs 31 which ride against the edge of the table 10 and hold the strip 30 firmly against the edge of the table. This arrangement makes it easy to move the template along the table while maintaining its proper angular position with respect thereto. This fabric guide is used in the same manner as the guide shown in Fig. 4, it being understood that duplicate sets of guiding members 33 and 28 are arranged on opposite sides of the members 34 and 24 so that when the template is reversed it is still possible to properly guide the template along the table.

Obviously, those skilled in the art to which this invention pertains may make various changes in the particular construction and arrangement and combination of the parts without departing from the spirit of this invention and therefore I do not wish to be limited in my invention except as may hereinafter be set forth in the claims hereunto appended.

Having thus fully described my invention, what I claim and desire to secure by Letters Patent of the United States is:

1. In a device for laying out fabric and the like, the combination with a table having a fabric-receiving surface and a guiding edge, and a template comprising a guiding strip for engaging said edge of the table, a fabric-guiding strip pivoted to said first-mentioned guiding strip, and means for holding said fabric-guiding strip in any of a number of angular positions with respect to said first-mentioned guiding strip, comprising a second member pivoted to said first guiding strip, a member bridging said fabric-guiding strip and said last-mentioned strip and provided with clamping means for holding these parts securely together in their adjusted relation with respect to each other.

2. In a device for laying out fabric and the like, the combination with a table having a fabric-receiving surface and a guiding edge, and a template comprising a flat guiding flange of substantial length for engaging said edge of said table, and a guided portion at a substantial angle to said guiding flange having a fabric-guiding edge extending at an angle with respect to said guiding flange, the said guiding flange having at least a substantial uninterrupted portion thereof free of any protuberances on the side away from said guided portion, whereby pressure can be exerted by the operator's body directly against said flange to hold said device firmly against the edge of the table without danger of tilting.

PARRY KELLER.